United States Patent [19]
Gröbler et al.

[11] Patent Number: 5,493,400
[45] Date of Patent: Feb. 20, 1996

[54] ARRANGEMENT FOR PROJECTING A TEST PATTERN ONTO A SURFACE TO BE INVESTIGATED

[75] Inventors: Bernhard Gröbler; Hartmut Heinz; Peter Hüttel; Günter Schöppe, all of Jena, Germany

[73] Assignee: Carl Zeiss Jena GmbH, Jena, Germany

[21] Appl. No.: 255,061

[22] Filed: Jun. 7, 1994

[30] Foreign Application Priority Data

Jun. 7, 1993 [DE] Germany ............................ 9308486 U

[51] Int. Cl.$^6$ .................................................. G01B 11/24
[52] U.S. Cl. .......................................... 356/376; 356/371

[58] Field of Search ................................... 356/271, 376; 250/237 G

[56] References Cited

FOREIGN PATENT DOCUMENTS 228089 10/1985 German Dem. Rep. .

Primary Examiner—F. L. Evans
Attorney, Agent, or Firm—Walter Ottesen

[57] ABSTRACT

An arrangement generates a projection beam path on the projection objective outside of the optical axis. This is achieved by mounting an optically transparent wedge forward or rearward of the test pattern. The wedge can be rotated with respect to its orientation by 180°.

12 Claims, 2 Drawing Sheets

ARRANGEMENT FOR PROJECTING A TEST PATTERN ONTO A SURFACE TO BE INVESTIGATED

BACKGROUND OF THE INVENTION

German patent publication DD 228,089 discloses projecting a grating image by projecting grating grooves via a projection objective at an angle not equal to 90° to the surface normal onto the surface to be investigated in order to obtain data from the deformed grating image as to the nature of the topography of the surface. The deformed grating images are reflected from the surface and/or are deformed in a controlled manner. In this publication, the required projection beam path is realized with the aid of an optically complex projection system. This projection beam path lies eccentrically to the optical axis of the projection objective.

A further possibility is to mount an aperture diaphragm eccentrically downstream of the projection light source which, however, leads to a considerable and unwanted limitation of the effective illuminating energy. However, if, and in lieu thereof, the light source itself is mounted eccentrically, then problems result when utilizing such an arrangement in conventional reflected-light microscopes.

SUMMARY OF THE INVENTION

In view of the foregoing, it is an object of the invention to provide the eccentric drive projection with a good light yield and so as to permit utilization in conventional optical light microscopes.

The arrangement of the invention is for projecting a test pattern onto a surface to be investigated and includes: a light source; optical means for defining a central optical axis and providing a beam path from the light source to the surface; test pattern means arranged in the beam path for defining a test pattern to be projected onto the surface; and, transparent optical wedge means associated with the test pattern means for shifting the beam off center away from the optical axis thereby causing the beam path to impinge on the surface at an angle not equal to 90° relative to a normal to the surface.

It is especially advantageous to reverse the orientation of the glass wedge (optical wedge) and thereby double the sensitivity of the arrangement by changing the projection angle. Errors associated with the grating or occurring because of shadow formation can be compensated for by the arrangement of the invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
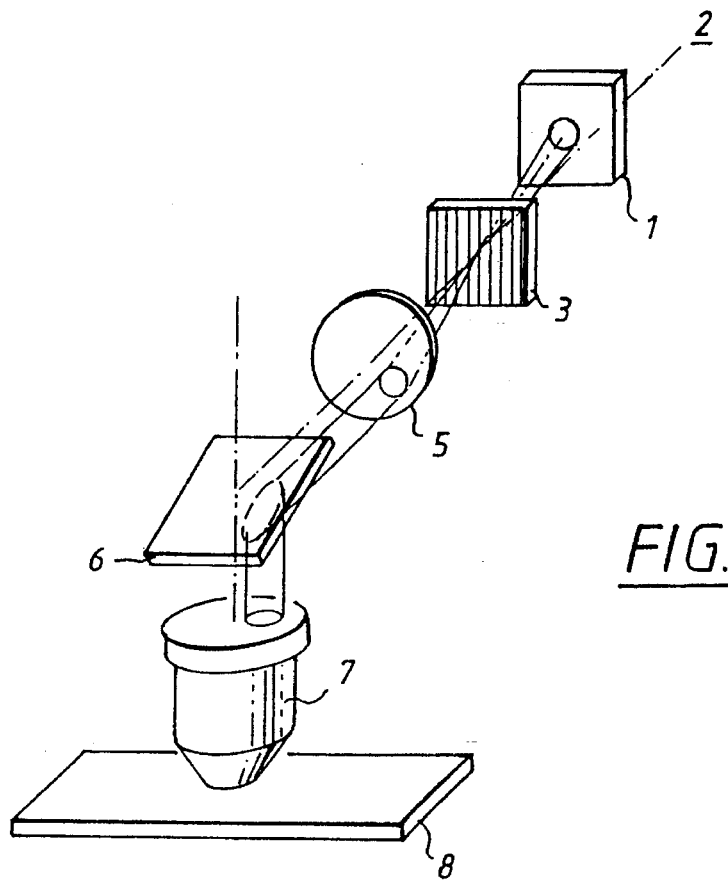
FIG. 1 is a perspective schematic showing the projection beam path with an eccentric aperture diaphragm.

In FIG. 1, an aperture diaphragm 1 is mounted downstream of a light source 2. The aperture diaphragm 1 is mounted eccentrically with respect to the optical axis and a grating 3 is illuminated via the aperture diaphragm. The grating 3 is imaged onto the surface 8 to be investigated via an objective 5, a beam splitter 6 and an objective 7. The projection beam path must pass through the objective 7 outside of its optical axis in order to obtain an angle of incidence unequal to 90° with respect to the surface.

Figure 2:
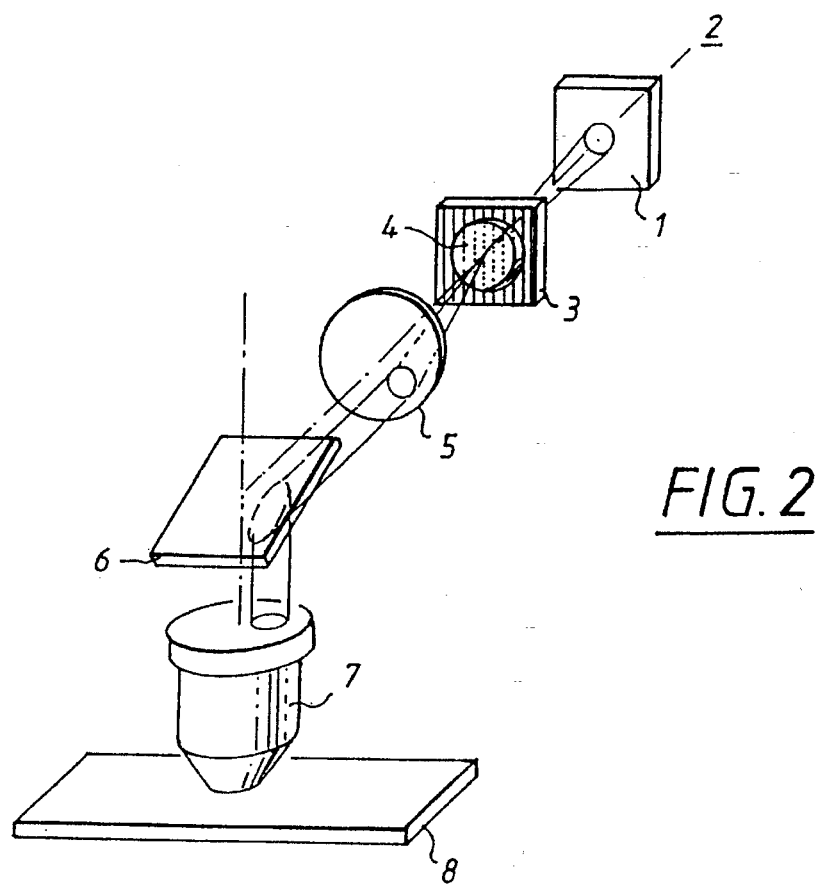
FIG. 2 shows an embodiment of the arrangement of the invention wherein a glass wedge is mounted in a beam path along the optical axis.

This off-axis condition is achieved in FIG. 2 for an illumination in the optical axis in that a glass wedge 4 is mounted downstream of the grating 3. The glass wedge 4 effects a displacement of the light path and therefore guides the beam off center on the objective 7.

Figure 3:
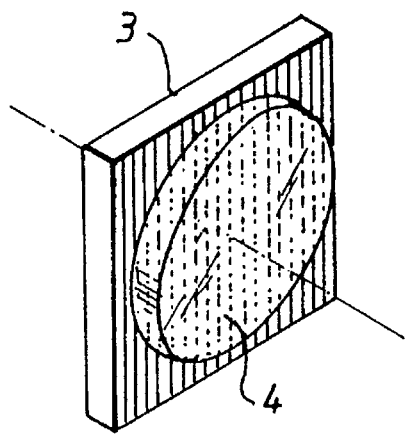
FIG. 3 shows a glass wedge cemented to the grating.

The glass wedge 4 can be fixedly joined to the grating as shown in FIG. 3.

Figure 4:
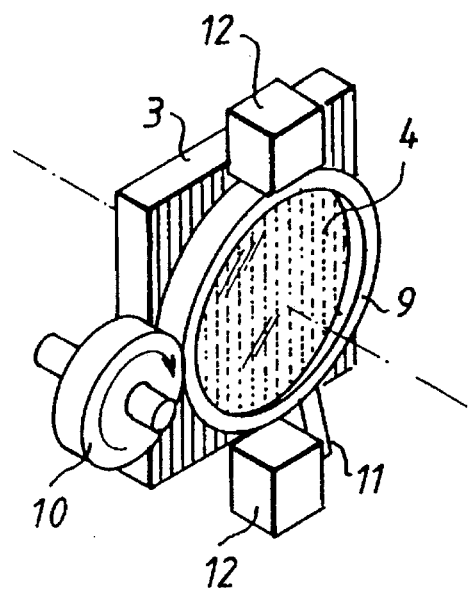
FIG. 4 shows a glass wedge mounted for rotation in a frame.

In FIG. 4, a ring-shaped frame 9 for the glass wedge 4 is shown. The frame 9 is driven by a drive 10, for example, via a pinion engaging the grating frame. In this way, the position of the glass wedge can be changed by 180°. A stop element 11 is provided for this purpose which coacts with end-position transducers 12.

Figure 5:
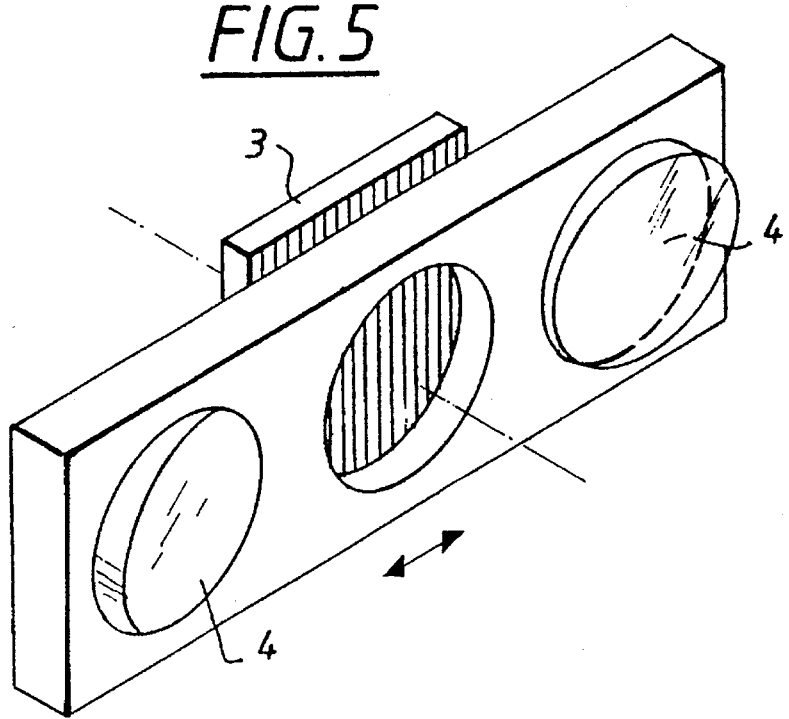
FIG. 5 shows an arrangement of a displaceable holder having two glass wedges orientated in mutual opposition.

Another embodiment is shown in FIG. 5 which changes the orientation of the glass wedge in the beam path. A slide 13 is mounted downstream of the grating 3 and is displaceable perpendicularly to the beam path in the direction of arrow 14. Two glass wedges 4, which are orientated so as to be in mutual opposition, are mounted in the slide 13 and the glass wedges can be selectively pushed into the beam path. The direction of incidence of the projection of the grating 3 onto the surface 8 can be changed by reversing the orientation of the glass wedge 4. The image of the grating grooves is changed by the surface topography and the evaluation of this image takes place via the beam splitter 6 in the direction of a recording and evaluation device 15 such as a CCD-camera connected to a computer.

The invention is not restricted to the embodiments shown. The reorientation of the glass wedge can take place by other mechanical means familiar to the person working in this area of technology. Also, the wedge can be mounted forward of the grating in the projecting direction.

It is understood that the foregoing description is that of the preferred embodiments of the invention and that various changes and modifications may be made thereto without departing from the spirit and scope of the invention as defined in the appended claims.

What is claimed is:

1. An arrangement for projecting a test pattern onto a surface to be investigated, the arrangement comprising:

a light source for supplying a light beam;

optical means for defining a central optical axis and providing a beam path for said light beam from said light source to said surface;

test pattern means arranged in said beam path for defining a test pattern to be projected onto said surface; and, transparent optical wedge means associated with said test pattern means for shifting said beam off center away from said optical axis thereby causing said beam path to impinge on said surface at an angle not equal to 90° relative to said surface.

2. The arrangement of claim 1, said optical wedge means being disposed downstream of said test pattern means.

3. The arrangement of claim 1, said optical wedge means being disposed upstream of said test pattern means.

4. The arrangement of claim 1, said test pattern means being a grating.

5. The arrangement of claim 1, further comprising position-changing means for moving said optical wedge means from a first position to a second position relative to said optical axis.

6. The arrangement of claim 5, said position-changing means comprising a rotatably mounted annular frame for holding said optical wedge means so as to be rotatable about said optical axis; and, actuating means for engaging and rotating said annular frame and said optical wedge means from said first position to said second position.

7. The arrangement of claim 6, said optical wedge means being rotated by 180° from said first position to said second position.

8. The arrangement of claim 5, said position-changing means comprising a holder mounted so as to be displaceable perpendicularly to said beam path; and, said optical wedge means including two wedges mounted in said holder so as to be orientated differently from each other.

9. The arrangement of claim 1, said test pattern means and said optical wedge means being fixedly joined to each other.

10. The arrangement of claim 4, said grating having a rectangularly-shaped transmission characteristic.

11. The arrangement of claim 4, said grating having a sinusoidally-shaped transmission characteristic.

12. The arrangement of claim 1, said optical means comprising: an aperture diaphragm mounted in said beam path between said light source and said test pattern means; a collimator lens mounted in said beam path downstream of said test pattern means; a beam splitter; and, an objective for imaging said test pattern means onto said surface.

* * * * *